(12) United States Patent
Bilhan

(10) Patent No.: US 6,750,910 B1
(45) Date of Patent: Jun. 15, 2004

(54) OPTICAL BLACK AND OFFSET CORRECTION IN CCD SIGNAL PROCESSING

(75) Inventor: Haydar Bilhan, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/353,919

(22) Filed: Jul. 15, 1999

Related U.S. Application Data

(60) Provisional application No. 60/092,912, filed on Jul. 15, 1998.

(51) Int. Cl.[7] .................................................. H04N 9/64
(52) U.S. Cl. ...................................... 348/243; 348/311
(58) Field of Search .................................. 348/241, 243, 348/244, 251, 311, 294; 250/208.1

(56) References Cited

U.S. PATENT DOCUMENTS

| | | | |
|---|---|---|---|
| 5,642,162 A | * 6/1997 | Maki et al. | 348/241 |
| 6,055,615 A | * 4/2000 | Okajima | 711/169 |
| 6,084,634 A | * 7/2000 | Inagaki et al. | 348/294 |
| 6,304,292 B1 | * 10/2001 | Ide et al. | 348/243 |
| 6,323,900 B1 | * 11/2001 | Kobayashi | 348/241 |

* cited by examiner

Primary Examiner—Tuan Ho
(74) Attorney, Agent, or Firm—J. Dennis Moore; W. James Brady, III; Frederick J. Telecky, Jr.

(57) ABSTRACT

An apparatus for providing optical black and offset calibration for an array signal comprising a sequence of voltage levels corresponding to a sequence of voltage samples of charge coupled devices arranged in an array. The apparatus includes a correlated double sampler adapted to receive the array signal and provide as an output a modified array signal comprising a sequence of first corrected output voltage levels. A programmable gain amplifier receives the modified array signal and provides as an output an amplified modified array signal comprising a sequence of second corrected output voltage levels. An analog to digital converter receives the amplified modified array signal and provides as an output a sequence of digital values. A digital signal storage device stores a digital value corresponding to a desired optical black level. A digital to analog converter stores a correction value corresponding to a determined correction and compensates the amplified modified array signal, based on the correction value, for variations from a desired black level. A correction digital circuit determines an average value corresponding to an average of a plurality of the digital values, subtracts that average value from, and adds a previously stored correction value to, the digital value to determine a current correction value. The current correction value is provided as the current correction value to the digital to analog converter for use thereby.

2 Claims, 8 Drawing Sheets

OPTICAL BLACK AND OFFSET CORRECTION IN CCD SIGNAL PROCESSING

This application claims benefit of 60/092,912 filed Jul. 15, 1998.

TECHNICAL FIELD OF THE INVENTION

The present invention relates generally to electronic circuits and, more particularly, to a charge coupled device, which provides optical black and offset correction.

BACKGROUND OF THE INVENTION

FIG. 1 illustrates, in block diagram form, a charge coupled device (CCD), which is an integrated array of photocells used in digital imaging. The analog front end of a CCD generally consists of three main elements: a correlated double sampler (CDS), a programmable gain amplifier (PGA), and an analog to digital converter (ADC).

For each CDS output, two CCD outputs are sampled (FIG. 2a). The first sample is taken during reference, and the second sample is taken during video signal. The difference is the corresponding CDS output. In this way, low frequency noise of the CCD signal is canceled.

As shown in FIG. 2b, a dark cell does not produce a zero differential output. This is due to the dark currents of the photocells, and the effect may vary from line to line in a frame. This dark current value will be referred as optical black level in this text. Due to the optical black level, and the internal offsets of all amplifiers used in the CDS, PGA and ADC, the resulting ADC output for a dark cell will not be zero. As can be seen from FIG. 1, the CDS offset and the optical black level will also be multiplied with the PGA gain. In order to achieve the ideal dynamic range for the signal (FIG. 2b), the black level and the offsets have to be canceled.

There are shortcomings in the currently known methods for canceling the offsets and black levels. In switched capacitor amplifiers, the conventional way to cancel the offset is accomplished by putting the amplifier in unity gain feedback during sampling phase. This way the input offset is also sampled and canceled during the amplification phase. However, for applications where high closed loop gain and high speed are required, the amplifiers may be optimized for high closed loop gain and may not be stable at unit gain feedback.

In continuous time PGAs, the black level can be canceled by putting the PGA in closed loop feedback during optical black period and feeding back the integrated error to the input of PGA as shown in FIG. 3. However, this scheme needs an accurate reference, and the desired ADC optical black level output will not be programmable by the user. In addition, if the PGA is not continuous time but discrete time (switched capacitor), because of the latency of the PGA continuous time feedback will not be possible.

The circuit arrangement shown in FIG. 4 works with discrete time PGAs, but it will take an unknown number of repetitions (lines) to cancel the offsets and optical black level. Also if the PGA gain is too high, the accuracy of the cancellation will be very poor.

SUMMARY OF THE INVENTION

In accordance with the present invention, the sum of the channel offset and optical black level is averaged for a given number of lines and optical black cells per line, and the channel is digitally calibrated to obtain a user programmed ADC output which corresponds to that average.

BRIEF DESCRIPTION OF THE DRAWINGS

The foregoing features of the present invention may be more fully understood from the detailed description, read in conjunction with the accompanying drawings, wherein.

DESCRIPTION OF THE PREFERRED EMBODIMENT

In accordance with the present invention, the sum of the channel offset and optical black level is averaged for a given number of lines and optical black cells per line, and the channel is digitally calibrated to obtain a user programmed ADC output which corresponds to that average.

Figure 6A:
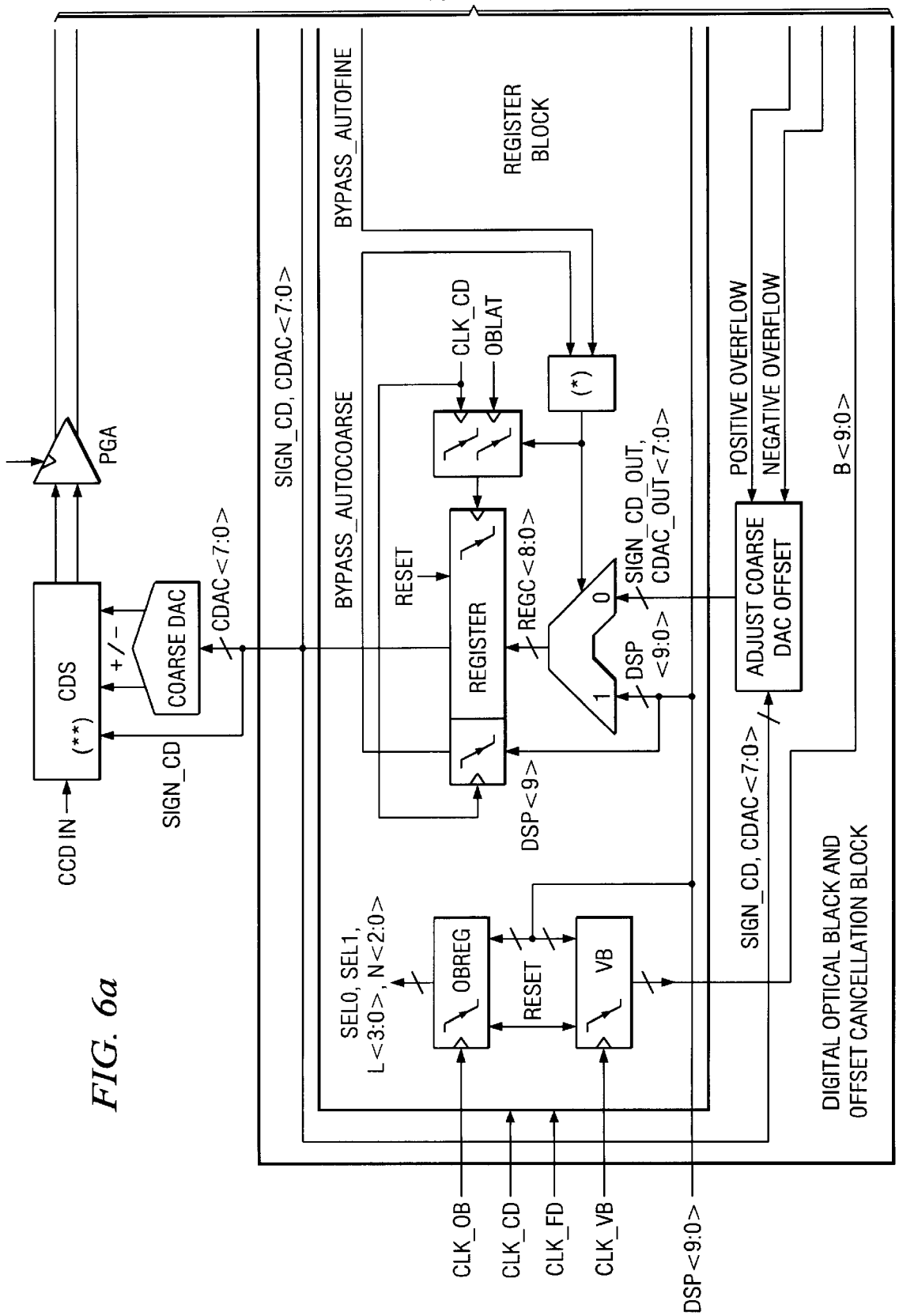
FIG. 6 illustrates an architecture for providing optical black and offset calibration in accordance with the present invention.
Figure 6B:
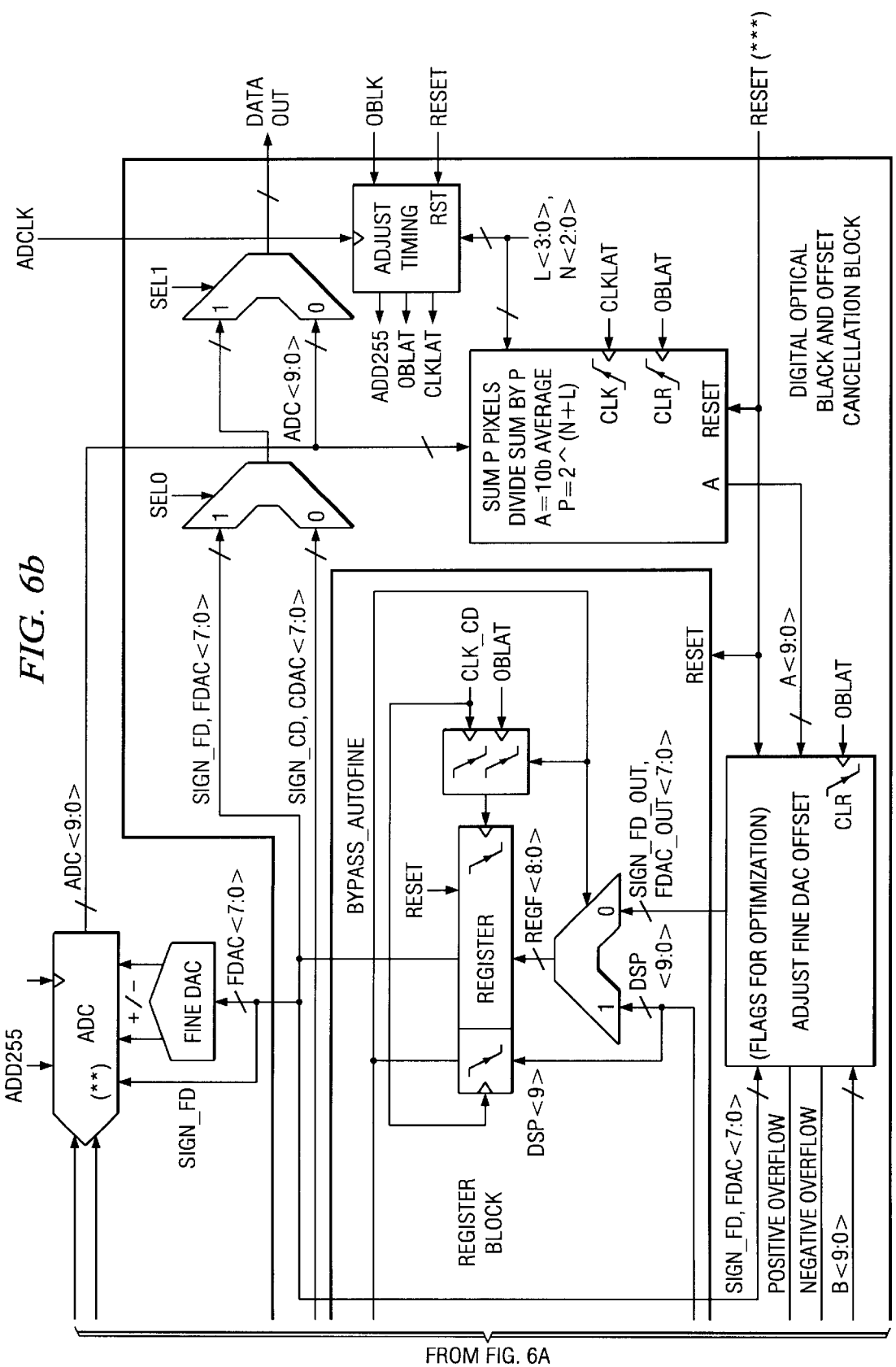
Figure 6C:
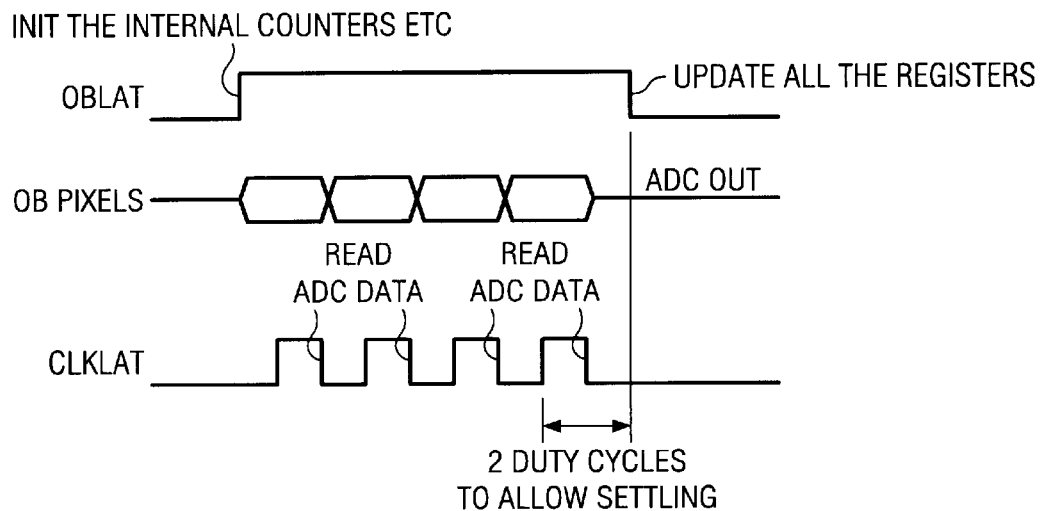
Figure 6C:
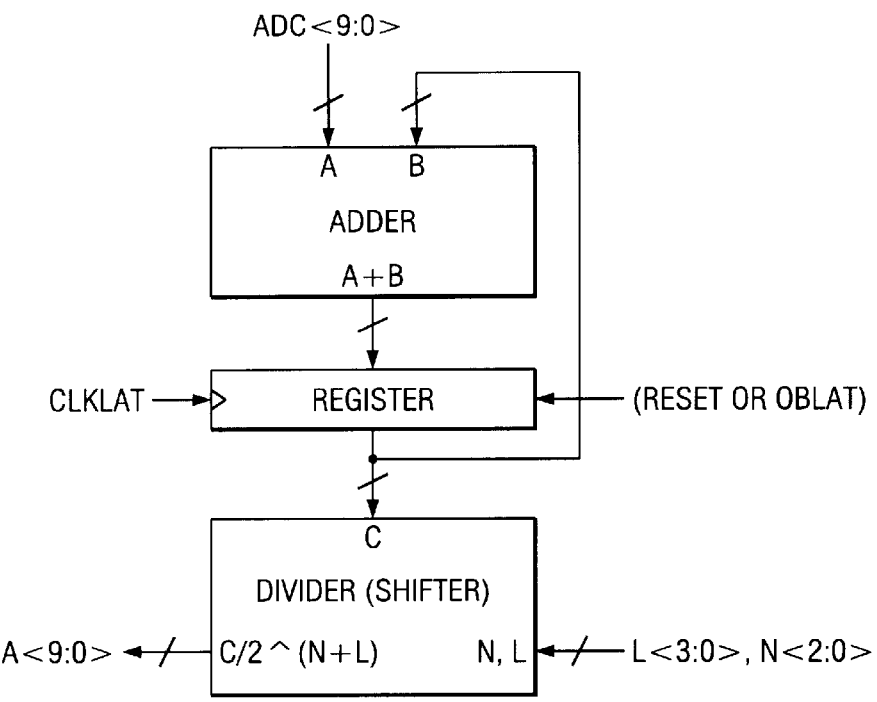
Figure 6C:
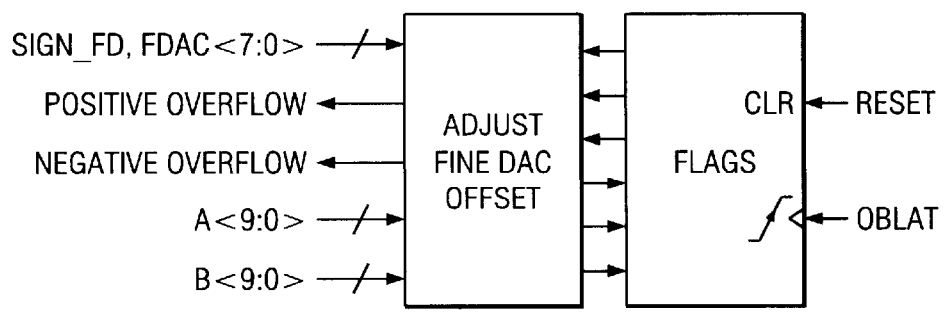

FIGS. 6a, 6b and 6c illustrate an architecture that realizes this procedure. A digital block takes the average of the ADC outputs for optical black level, and controls two digital to analog converters (DACs) in order to compensate for the channel offset and optical black correction. The DAC before CDS is used in order to correct the coarse offset, and the one before the ADC is used for fine offset correction.

For each line the ADC outputs corresponding to the optical black levels are sampled and are averaged by the digital block. The user can program the number of optical black cells per line and the number of lines to be averaged. The user activates the optical black (OBLK) pulse in order to let the digital block know the start of optical black cells, as shown in the timing diagram of FIG. 7. The resulting average is compared with the desired output for optical black level. If they are equal, both offset DACs are kept same. If the average ADC output is not equal to the desired value and if $$B - A + P\_FDAC \qquad \{1\}$$

where

B: Desired optical black level

A: Averaged ADC outputs for optical black cells

P_FDAC: Previous Fine DAC register value is within the range of fine DAC (+/−255 ADC least significant bits (LSBs) for an 8-bit DAC) the offset is immediately corrected by writing the quantity of Equation {1} to the fine DAC register.

If the offset is out of the range of the fine DAC, the coarse DAC is incremented or decremented depending if the offset is negative or positive. Once in the coarse mode, the system continues updating coarse DAC until the output is closest to the desired value. This way the range for the fine DAC is optimized. The remaining residue is corrected by the fine DAC.

Figure 8:
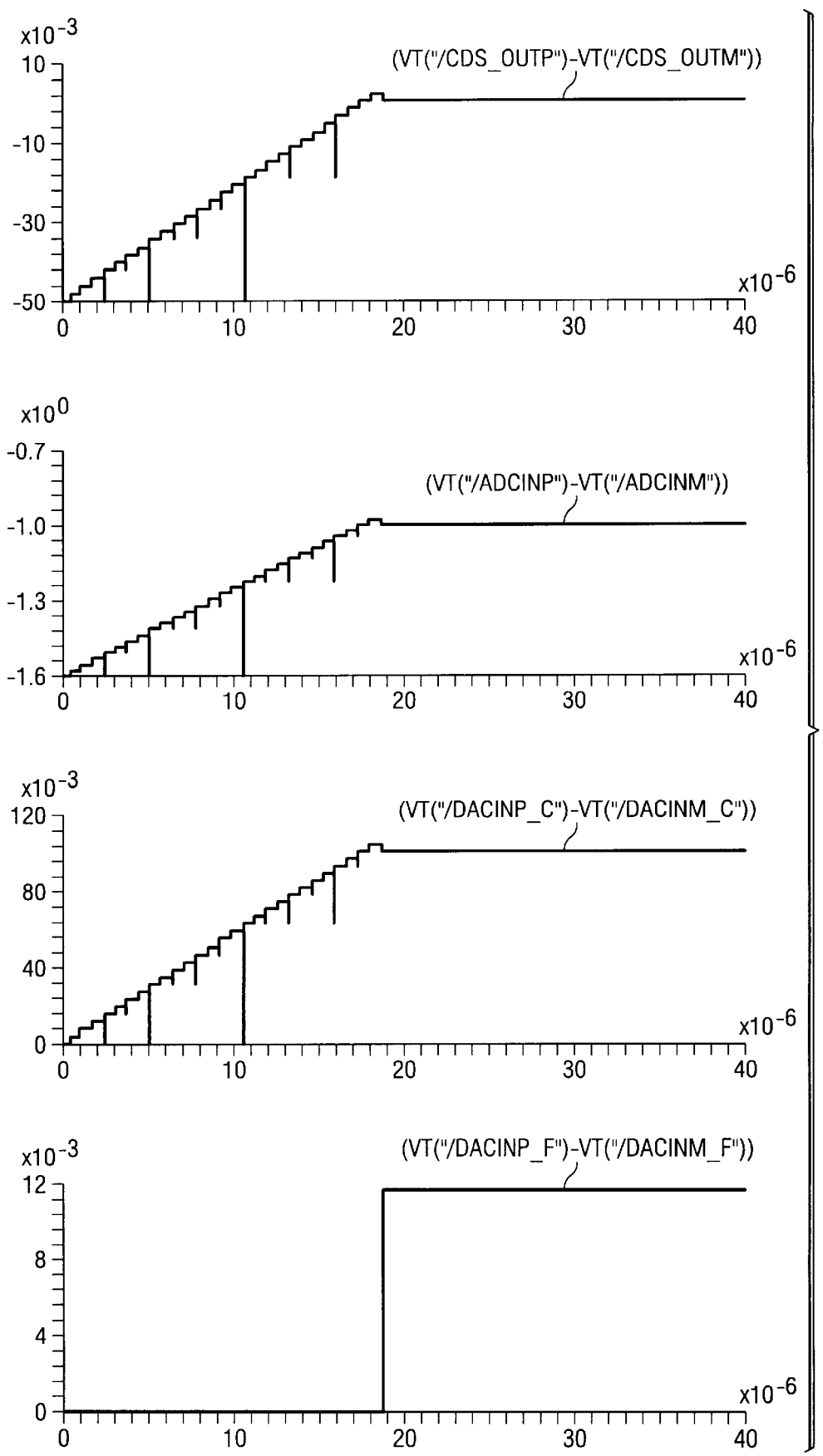
FIGS. 8–10 are timing diagrams that simulate the performance of the circuit of FIG. 6.
Figure 9:
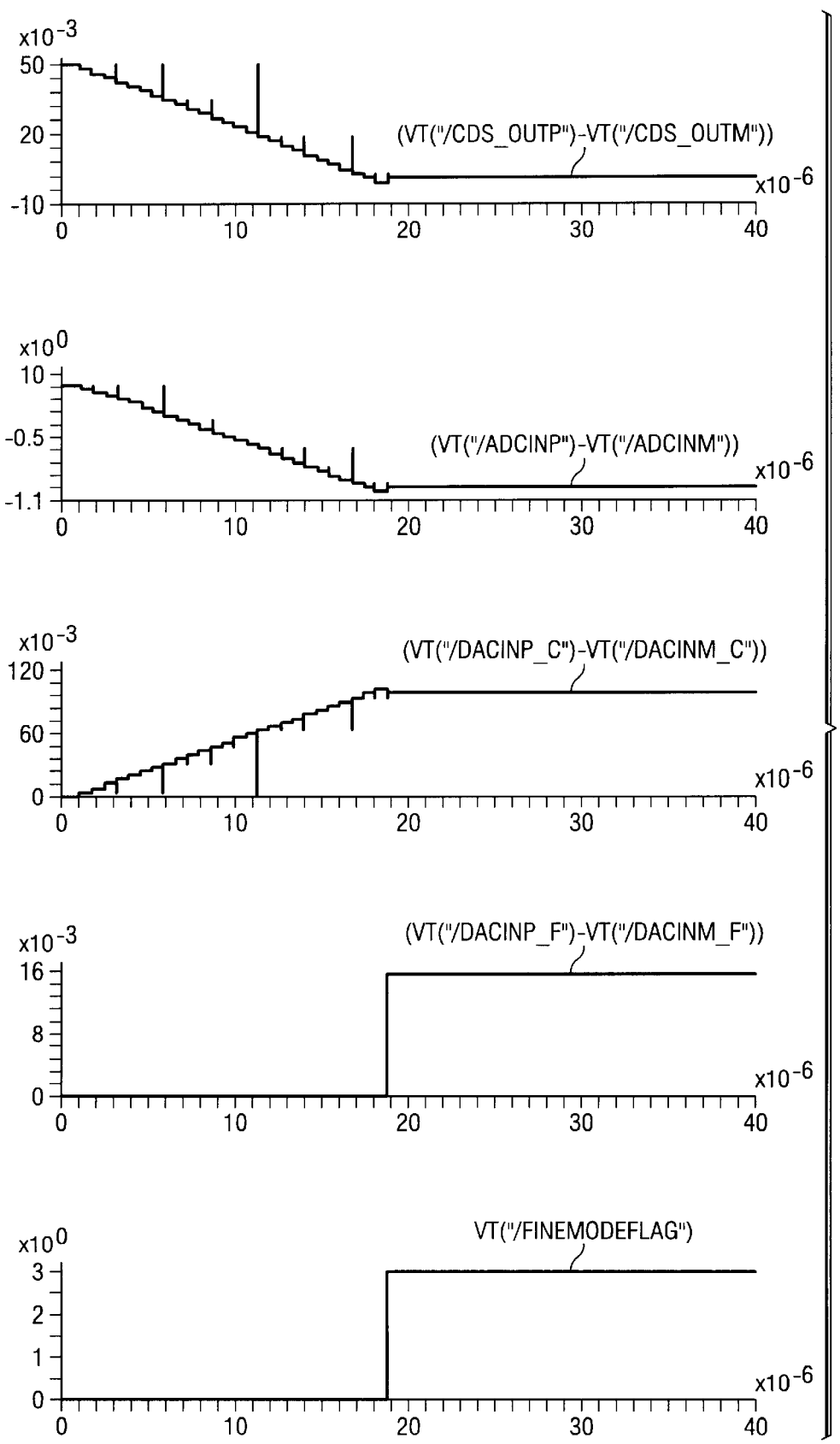

The coarse DAC is in closed loop feedback for each line. In coarse mode, it may take more than one repetition to correct the offset; but in fine mode, offset is corrected immediately for each line. Because of the optimization described above, for relatively large optical level swings (close to +/−255 LSBs for an 8-bit Fine DAC) will be corrected immediately. FIGS. 8 and 9 show the simulation results for positive and negative overall coarse offset and optical black level cancellation.

Figure 1:
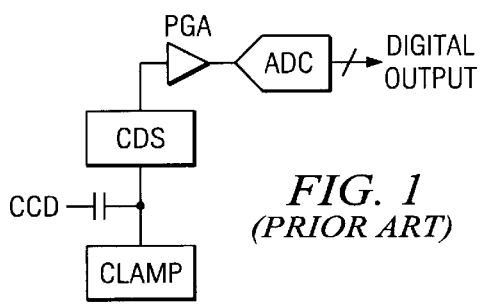
FIG. 1 is a block diagram of an analog front end for a CCD in accordance with the prior art.
Figure 2B:
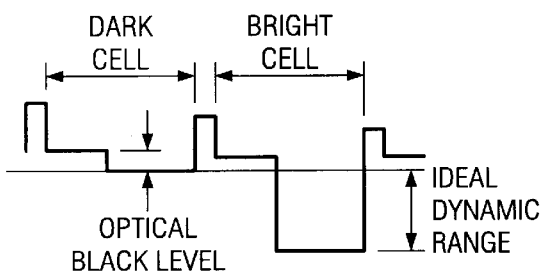
FIGS. 2a and 2b are waveforms useful in understanding the circuit of FIG. 1.
Figure 2A:
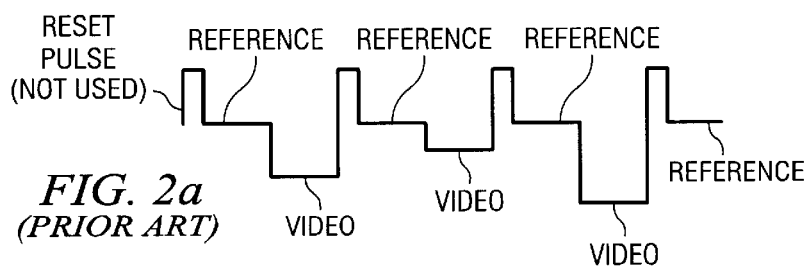
Figure 3:
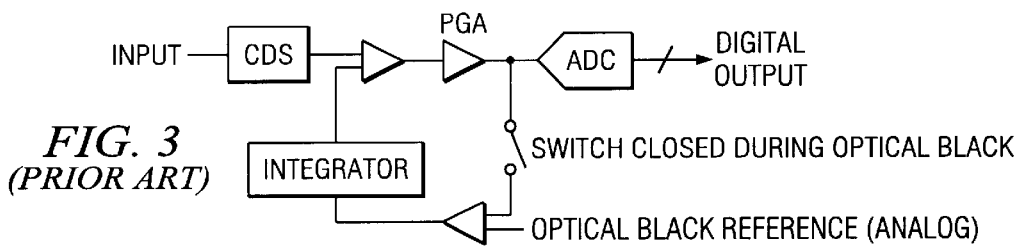
FIG. 3 illustrates prior art optical black calibration in system a system using a continuous time programmable gain amplifier.
Figure 4:
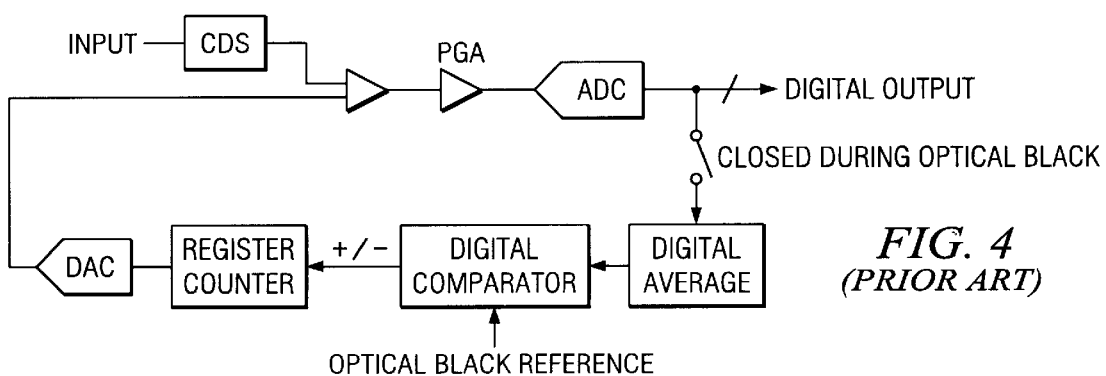
FIG. 4 illustrates prior art optical black calibration in system a system using a discrete time programmable gain amplifier.
Figure 5:
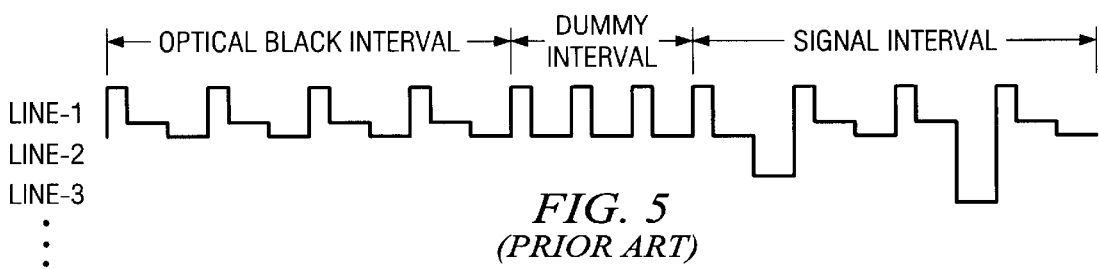
FIG. 5 is a waveform illustrating a CCD output frame with an optical black interval and a signal interval.
Figure 7:
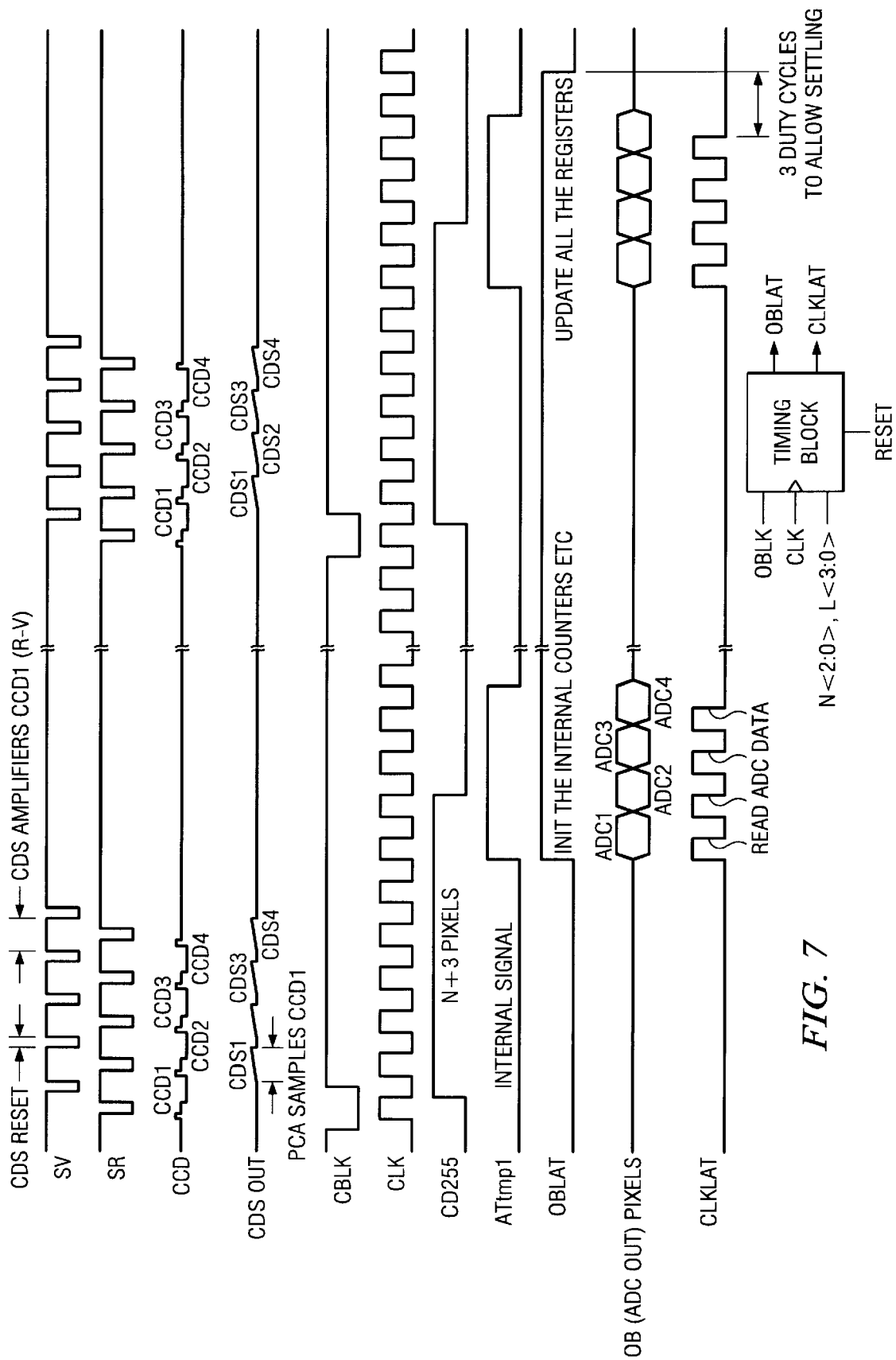
FIG. 7 is a timing diagram useful in understanding the circuit of FIG. 6.
Figure 10:
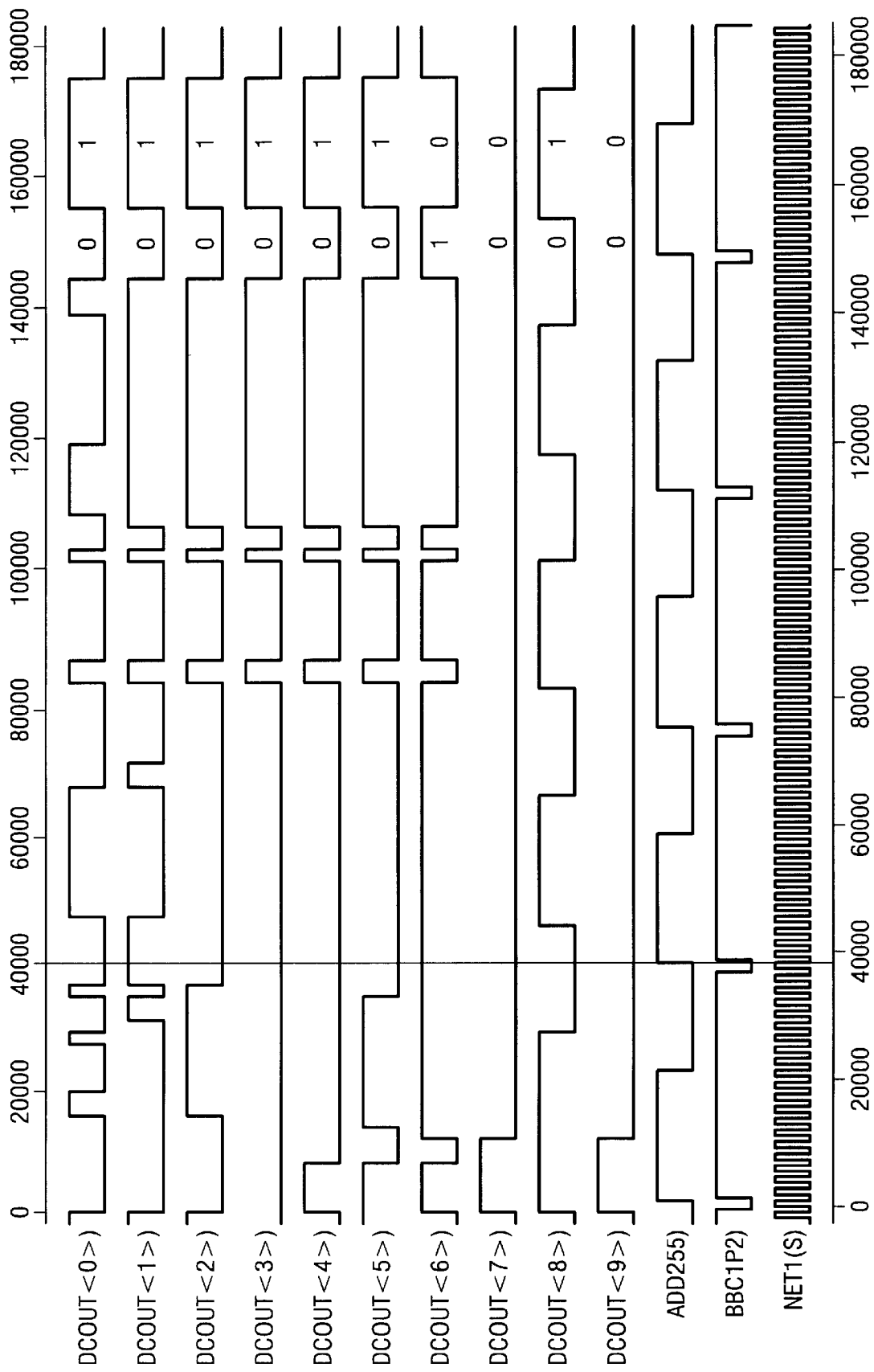

Since the ADC will clip off the negative values and give digital 0 for them, an additional offset circuit is used. This circuit adds an intentional offset that corresponds to 25 ADC LSBs only during optical black period. This signal is shown as "ADD255" in FIG. 6b, and the timing is shown in FIG. 7. This way, negative offsets will not be clipped off at the digital output, and they will be mapped to (255-Offset) during optical black period LSBs. Corresponding simulation result is shown in FIG. 10. Note that during optical black level, the ADC output has a constant offset of 255 LSBs. Since the offset does not exist during signal interval (FIG. 5), it is transparent to the digital signal processor or application specific integrated circuit (ASIC) used, for example, in a digital camera.

Specific implementation details of the apparatus shown in FIGS. 6a, 6b and 6c should be noted, as follows. The apparatus operates in two modes: coarse mode and fine mode. In coarse mode, the coarse DAC is adjusted until a minimum fine DAC value is reached, at which point fine mode is entered. In fine mode, only the fine DAC is changed until an overflow occurs. In the case of an overflow in fine mode, the apparatus is switched to coarse mode again. The coarse DAC register is incremented or decremented depending on its sign and the overflow signal. It is clipped at either all 0's or all 1's. Further, in connection with the BYPASS__AUTOCOARSE and BYPASS__AUTOFINE signals (FIG. 6a), if the fine DAC adjust is not in auto mode, the coarse DAC adjust may not be in auto mode, either. In addition, in connection with the SIGN_CD and SIGN_FD signals (FIGS. 6a & 6b), a value of 0 causes the DAC value to be added, while a value of 1 causes the DAC value to be subtracted. Also, at reset, the DAC registers are both initialized to "0 0 00000000", where the MSB indicates auto mode, and the next MSB indicates sign ("+"). After this initialization, auto mode is entered, N is initialized to 3 lines to 0 (8 pixels, 1 line), and the PGA gain is initialized to 60H (~6 DB). This top of FIG. 6c shows timing of the initialization of the internal counters, etc., and the updating of all registers, relative to the signal OBLAT. Note that assuming 2^N=4 and 2^L=1, N can only be 0, 1, 2, 3, 4, 5 or 6, and L can only be 0, 1, 2, 3, 4, 5, 6, 7 or 8.

In addition, note that one coarse DAC LSP·K1=1 ADC LSB·PGA gain (K1: constant ratio of caps). Further, 1 fine DAC LSB·K2=1 ADC LSB (cap ratio must match: K2).

Finally, in connection with the Adjust Fine DAC Offset control, shown at the bottom of FIG. 6c, note that (+/−)FDAC_OUT=B +(+/−)FDAC-A bits: 1 8 10 1 8 10

SIGN=0→(+VL) 1→(−YL).

The present invention finds application in a great many video systems including digital still cameras, digital video cameras, digital video processing systems and CCD signal processors.

The present invention provides significant advantages over conventional architectures including digital programmability, fine resolution, and compatibility for both continuous time and discrete time programmable gain amplifiers.

While the principles of the present invention have been demonstrated with particular regard to the structures and methods disclosed herein, it will be recognized that various departures may be undertaken in the practice of the invention. The scope of the invention is not intended to be limited to the particular structures and methods disclosed herein, but should instead be gauged by the breadth of the claims that follow.

What is claimed is:

1. An apparatus for providing optical black and offset calibration for an array signal comprising a sequence of voltage levels corresponding to a sequence of voltage samples of charge coupled devices arranged in an array, comprising:

a correlated double sampler adapted to receive the array signal and provide as an output a modified array signal comprising a sequence of first corrected output voltage levels;

a programmable gain amplifier adapted to receive the modified array signal and provide as an output an amplified modified array signal comprising a sequence of second corrected output voltage levels;

an analog to digital converter adapted to receive the amplified modified array signal and provide as an output a sequence of digital values;

a digital signal storage device adapted to store a digital value corresponding to a desired optical black level;

a digital to analog converter adapted to store a correction value corresponding to a determined correction and to compensate the amplified modified array signal, based on the correction value, for variations from a desired black level;

a correction digital circuit adapted to determine an average value corresponding to an average of a plurality of the digital values, to subtract the average value from, and add a previously stored correction value to, the digital value to determine a current correction value, and to provide the current correction value to the digital to analog converter.

2. An apparatus as in claim 1, further comprising an offset compensation unit adapted to further compensate the amplified modified array signal by the addition of an offset signal corresponding to a predetermined number of least significant bits of the digital values during an optical black period, to thereby cause the digital values to have a constant offset of the predetermined number of least significant bits during optical black level.

* * * * *